(12) United States Patent
Mattioli et al.

(10) Patent No.: US 7,575,419 B2
(45) Date of Patent: Aug. 18, 2009

(54) FUEL PUMP FOR AN INTERNAL COMBUSTION ENGINE

(75) Inventors: Massimo Mattioli, Castelmaggiore (IT); Paolo Pasquali, Castelmaggiore (IT); Luigi Gagliardi, Bologna (IT)

(73) Assignee: Magneti Marelli Powertrain S.p.A., Corbetta (IT)

( * ) Notice: Subject to any disclaimer, the term of this patent is extended or adjusted under 35 U.S.C. 154(b) by 344 days.

(21) Appl. No.: 11/436,999

(22) Filed: May 19, 2006

(65) Prior Publication Data

US 2006/0275166 A1 Dec. 7, 2006

(30) Foreign Application Priority Data

May 20, 2005 (EP) .................. 05425349

(51) Int. Cl.
*F04B 49/03* (2006.01)
*F16K 15/14* (2006.01)

(52) U.S. Cl. .................. 417/298; 417/385; 137/512.15; 137/859

(58) Field of Classification Search .................. 417/569, 417/587, 298, 385; 137/512.15, 513, 512.4, 137/516.11, 859, 512.5
See application file for complete search history.

(56) References Cited

U.S. PATENT DOCUMENTS

| 2,191,458 | A | * | 2/1940 | Duden | 137/844 |
| 2,578,746 | A | * | 12/1951 | Scherger et al. | 417/388 |
| 5,520,523 | A | | 5/1996 | Yorita et al. | |
| 6,223,724 | B1 | * | 5/2001 | Miyaji et al. | 123/446 |
| 7,004,734 | B2 | * | 2/2006 | Izawa et al. | 417/569 |
| 2002/0176786 | A1 | * | 11/2002 | Hirose et al. | 417/269 |
| 2003/0091445 | A1 | * | 5/2003 | Bastia et al. | 417/298 |
| 2004/0094128 | A1 | * | 5/2004 | Ranaldo et al. | 123/458 |

OTHER PUBLICATIONS

Office Action in EP 05425349.7 dated Feb. 6, 2007.

* cited by examiner

*Primary Examiner*—Charles G Freay
(74) *Attorney, Agent, or Firm*—Venable LLP; Robert Kinberg; Leigh D. Thelen

(57) ABSTRACT

A fuel pump for an internal-combustion engine; the fuel pump is provided with: a variable-volume chamber for containing fuel; an intake valve connected to the variable-volume chamber; a delivery valve connected to the variable-volume chamber; and a pumping device for varying the volume of the first variable-volume chamber. The intake valve has a disk provided with a plurality of through supply holes, and a deformable lamina, which is fixed to the disk in a position corresponding to a peripheral edge thereof and is provided with a series of flaps, each of which is coupled to a respective supply hole.

7 Claims, 3 Drawing Sheets

FUEL PUMP FOR AN INTERNAL COMBUSTION ENGINE

CROSS-REFERENCE TO RELATED APPLICATIONS

This application claims the priority of European Patent Document No. 05425349.7, filed on May 20, 2005, the subject matter of which is incorporated herein by reference.

BACKGROUND OF THE INVENTION

The present invention relates to a fuel pump for an internal-combustion engine. In particular, the present invention relates to a fuel pump for a system for direct injection of petrol, to which the ensuing treatment will make explicit reference without this implying any loss of generality.

In systems for direct injection of petrol, it is known to use a petrol pump, which comprises a pumping chamber delimited at the bottom by a mobile surface so as enable cyclic variation of its volume. Set in a position corresponding to a top surface of the pumping chamber is a one-way intake valve, which sets the pumping chamber in communication with a petrol tank to enable a flow of petrol towards the pumping chamber, and a one-way delivery valve, which sets the pumping chamber in communication with a pipe for supplying the injectors to enable a flow of petrol under pressure from the pumping chamber.

Generally, both the intake valve and the delivery valve are of the ball type, i.e., each valve comprises a spherical valve body, which is mobile, along a channel for supply of the petrol, and a valve seat, which is designed to be engaged in a fluid-tight way by the spherical valve body and is set at one end of the supply channel. A spring pushes the spherical valve body towards a position of engagement of the valve seat in a fluid-tight way.

A ball valve has quite a high inertia due basically to the non-negligible mass of the spherical valve body and to the need to overcome during opening the elastic force generated by the spring. The high inertia of a ball valve is negligible when the difference of pressure across the valve is high, but becomes significant when the difference of pressure across the valve is reduced. Consequently, a ball valve is suited for being used as delivery valve of a petrol pump, but proves less suited for being used as intake valve of a petrol pump in so far as it is relatively slow.

For example, a petrol pump with a single pumping element (i.e., with just one compression chamber) can arrive at performing 14 000 pumping strokes per minute when the motor is at the maximum r.p.m., namely 7 000 r.p.m. Consequently, it has been estimated that in a four-cylinder engine with approximately two litres of displacement, the mean capacity of the pump, and hence of each valve, can be in the region of 150 litres per hour, whilst the instantaneous maximum capacity of the pump, and hence of each valve, can arrive at 800 litres per hour. To reach an instantaneous capacity of 800 litres per hour, carrying out 14 000 pumping strokes per minute, it is necessary for both of the valves to be particularly fast both during opening and during closing.

U.S. Pat. No. 6,223,724 disclose a high-pressure fuel pump, in which an opening of the low pressure fuel inlet and a high pressure fuel outlet are controlled by a valve system comprising a pair of plates and a flexible sheet having flaps of larger dimensions than the inlet dimensions but smaller than the outlets.

SUMMARY OF THE INVENTION

The aim of the present invention is to provide a fuel pump for an internal-combustion engine that will be free from the drawbacks set forth above and will be simple and inexpensive to produce.

In accordance with the present invention, a fuel pump is provided for an internal-combustion engine according to the attached claims.

BRIEF DESCRIPTION OF THE DRAWINGS

The present invention will now be described with reference to the annexed plate of drawings, which illustrate some non-limiting examples of embodiment thereof, and in which.

DETAILED DESCRIPTION OF THE INVENTION

Figure 1:
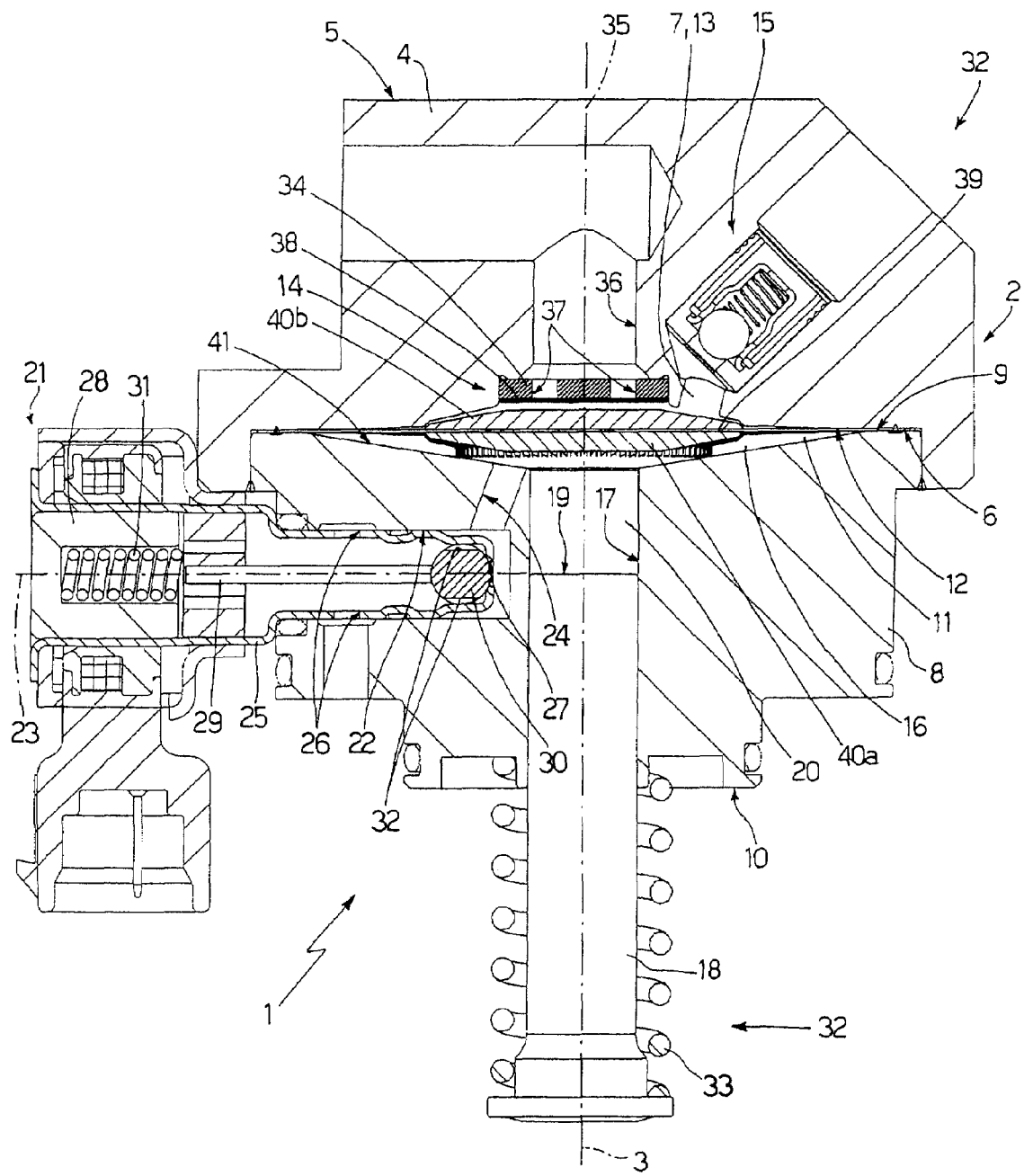
FIG. 1 is a longitudinal and schematic cross-sectional view of a fuel pump made in accordance with the present invention.

With reference to FIG. 1, number 1 designates, as a whole, a petrol pump for a direct-petrol-injection internal-combustion engine (not illustrated).

The pump 1 comprises a pump body 2, which has a longitudinal axis 3 and, in turn, comprises a top plate 4, which is limited axially by two plane surfaces 5 and 6 orthogonal to the longitudinal axis 3 and has a cylindrical cavity 7 sharing the longitudinal axis 3. The cylindrical cavity 7 opens outwards in an area corresponding to the surface 6 and is closed by a bottom plate 8 set in contact with the surface 6 and fixed to the plate 4 itself by welding.

The bottom plate 8 is limited axially by two plane surfaces 9 and 10 orthogonal to the longitudinal axis 3. The surface 9 of the bottom plate 8 is set in contact with the surface 6 of the top plate 4 and has a cylindrical cavity 11, which is made through the plate 8 sharing the longitudinal axis 3 and opens outwards both in an area corresponding to the surface 9 and in an area corresponding to the surface 10.

The cavities 7 and 11 are separated from one another via a deformable membrane 12, which is made of stainless steel, is welded between the plates 4 and 8 in a position corresponding to a peripheral edge thereof, and defines, together with the cavity 7, a variable-volume chamber 13 for containing the petrol. Set within the top plate 4 are an intake valve 14 and a delivery valve 15, which are in communication with the variable-volume chamber 13.

The cavity 11 comprises a widened top portion 16 set in a position facing the membrane 12, and a restricted bottom portion 17 slidably engaged by a piston 18 having an active end face 19, which extends in a direction orthogonal to the longitudinal axis 3 and defines, together with the cavity 11 and with the membrane 12, a chamber 20 with a substantially constant volume for containing the oil of the engine (not illustrated).

The chamber 20 is provided with an electromagnetic valve 21 mounted within a cavity 22, which is made in the plate 8, has an axis 23 transverse to the longitudinal axis 3, and communicates with the chamber 20 through a hole 24 made through the plate 8 itself. The valve 21 comprises an external tubular sleeve 25, which is substantially cup-shaped, is housed within the cavity 22 so that it shares the transverse axis 23, and is provided with a plurality of radial holes 26, which are uniformly distributed about the transverse axis 23 to enable supply of the oil within the sleeve 25 itself, and with an axial hole 27.

The sleeve 25 is closed axially by an electromagnet 28 and houses inside it a ball-type open/close element 29, which is slidably coupled to the sleeve 25 and has a ball 30 for closing the hole 27. The open/close element 29 and, hence, the ball 30 are normally set, under the thrust of a spring 31 set between the electromagnet 28 and the open/close element 29, in a position (FIG. 2) for closing the hole 27, and are displaced by the electromagnet 28 against the action of the spring 31 in a position (not illustrated) for opening the hole 27, in which the oil is fed to the hole 27 itself through a plurality of feed channels 32 made on the outer surface of the ball 30 parallel to the axis 23.

The piston 18 is mobile along the bottom portion 17 of the cavity 11 for performing, under the thrust of an actuating device 32 (only partially illustrated), a reciprocating rectilinear motion comprising a forward stroke, during which the membrane 12 is displaced from an operating position of pumping (illustrated in FIG. 1) to a resting position (not illustrated) and the volume of the chamber 13 increases so as to bring about opening of the intake valve 14, and a backward stroke, during which the membrane 12 is displaced from the resting position to the operating position of pumping, and the volume of the chamber 13 decreases so as to bring about opening of the delivery valve 15.

The actuating device 32 comprises a spring 33, which is fitted on the piston 18 so that it shares the longitudinal axis 3 and is set between the plate 8 and the piston 18 for imparting on the piston 18 itself its forward stroke, and a cam (not illustrated) mounted so that it can turn about a central axis thereof perpendicular to the longitudinal axis 3. The cam (not illustrated) co-operates with a tappet roller (not illustrated) coupled in a rotatable way and axially fixed to the piston 18 so as to impart on the piston 18 itself its backward stroke.

The delivery valved 15 is a ball valve, whilst the intake valve 14 comprises a disk 34, which is mounted orthogonal to the axis 35 of a pipe 36 for supply of the petrol to the chamber 13 and is provided with a plurality of supply holes 37 made through the disk 34 parallel to the axis 35. The intake valve 14 moreover comprises a deformable lamina 38, which is fixed to the disk 34 in a position corresponding to a peripheral edge thereof and is provided with a series of flaps 39 (illustrated in detail in FIGS. 2 and 3), each of which is coupled to a respective supply hole 37. Normally, each flap 39 of the lamina 38 is set in a position for closing the supply hole 37 and is mobile, during the forward stroke of the piston 18, from the position for closing to a position for opening the supply hole 37 itself to enable inlet of petrol into the chamber 13.

The membrane 12 has a central portion gripped between two substantially cup-shaped stiffening elements 40 arranged one (hereinafter designated by 40a) in the chamber 13 and the other (hereinafter designated by 40b) in the chamber 20. The stiffening element 40b is shaped so as to set itself in contact, during the forward stroke of the piston 18, with a wall 41 delimiting the chamber 20 and hence to control deformation of the membrane 12. Furthermore, the stiffening element 40b is provided with a plurality of radial channels (not illustrated in detail) designed to enable passage of the oil through the stiffening element 40b when the stiffening element 40b itself is set in contact with the wall 41. According to a variant (not illustrated), the channels of the stiffening element 40b could be replaced with a corresponding plurality of supply channels made on the wall 41.

The membrane 12, the chamber 20, the piston 18, and the actuating device 23 define a pumping device that uses the oil contained in the chamber 20 for deforming the membrane 12 and hence varying the volume of the chamber 13. Deformation of the membrane 12 is controlled selectively by making the membrane 12 and the piston 18 in such a way that the value of the ratio between the surface of the membrane 12 and the surface of the face 19 is at least five.

In an initial step of filling of the chamber 20, the electromagnet 28 is excited for displacing the open/close element 29 and hence the ball 30 into their position for opening the hole 27 so as to supply to the hole 24 and hence to the chamber 20 a given initial amount of oil. In use, the initial amount of oil fed into the chamber 20 can be kept constant by selectively opening the valve 21 so as to supply an amount of oil to the chamber 20 that is substantially equal to the amount of oil that each time comes out of the chamber 20 itself by seepage between the bottom portion 17 of the cavity 11 and the piston 18.

From what has been set forth above, it follows that the pressure exerted on the membrane 12 during the backward stroke of the piston 18 and, hence, the displacement of the membrane 12 from its resting position into its operating position of pumping, i.e., the opening of the delivery valve 15, depend upon the amount of oil contained in the chamber 20 and are controlled selectively via the valve 21.

The spring 31 is, moreover, calibrated in such a way as to push the open/close element 29 into its position for closing the hole 27 with a force in any case lower than the one, of opposite direction, exerted on the open/close element 29 itself by the oil contained in the chamber 20 and in the hole 24 when the value of the pressure of the oil in the chamber 20 is higher than a given threshold value of maximum pressure. In this way, in the case of overpressure, the oil is discharged through the holes 26 consequently preventing any failure of the membrane 12.

Operation of the pump 1 can be readily inferred from what has been set forth above and does not call for any further explanations.

Figure 2:
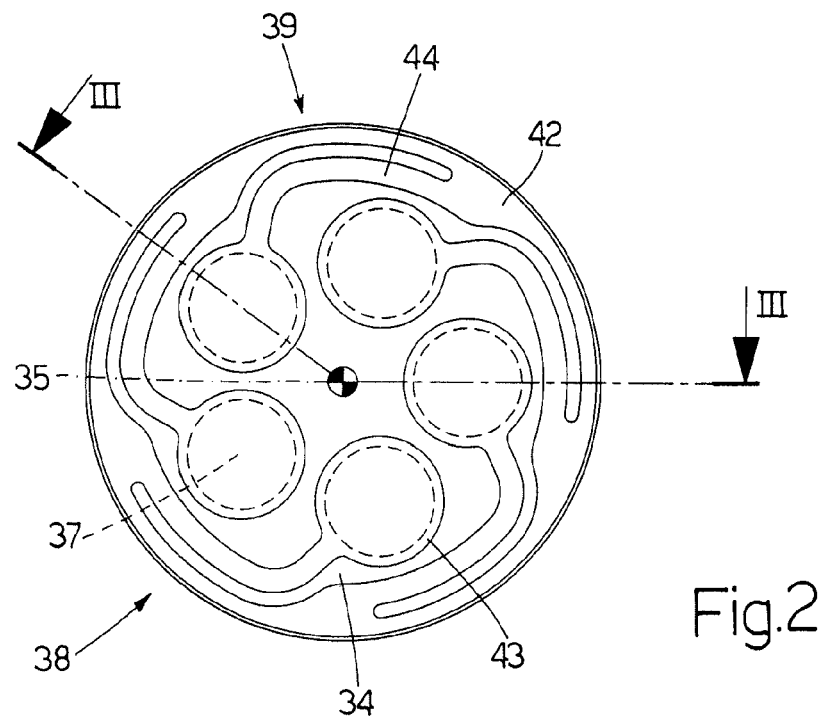
FIG. 2 is a plan view from beneath of an intake valve of the fuel pump of FIG. 1.
Figure 3:
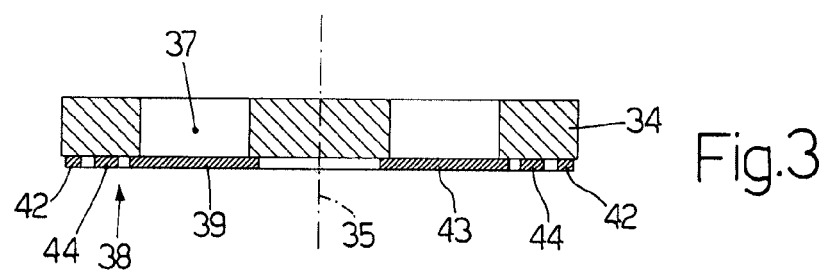
FIG. 3 is a longitudinal cross-sectional side view according to the line III-III of the intake valve of FIG. 2.
Figure 4:
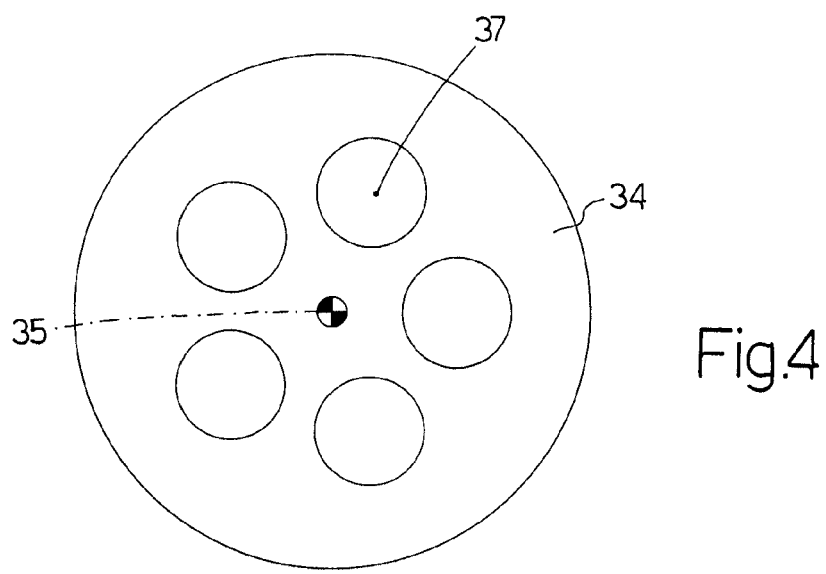
FIG. 4 is a top plan view of the intake valve of FIG. 2.

According to what is illustrated in FIGS. 2, 3 and 4, the lamina 38 of the intake valve 14 comprises an outer ring 42, which is fixed to the disk 34 by welding (preferably by laser spot-welding). Extending inwards from the ring 42 are the flaps 39, each of which comprises a sealing element 43, which has a circular shape and is connected to the ring 42 by means of a thin stem 44, i.e., a stem having a length much greater than the width so as to be able to deform elastically. Consequently, each sealing element 43 is set in a position for closing the supply hole 37 as a result of the elastic thrust generated by the stem 44. During the forward stroke of the piston 18, the pressure of the petrol along the supply pipe 36 acts on each sealing element 43 bringing about an elastic deformation of the stem 44 and consequently causing displacement of the sealing element 43 from the position for closing to a position for opening the supply hole 37 to enable inlet of the petrol into the chamber 13.

According to a preferred embodiment, the deformable lamina 38 is obtained starting from a sheet of elastic steel, which is photo-etched. Next, the deformable lamina 38 is connected to the disk 34, which is obtained by stamping, using laser spot-welding.

Figure 5:
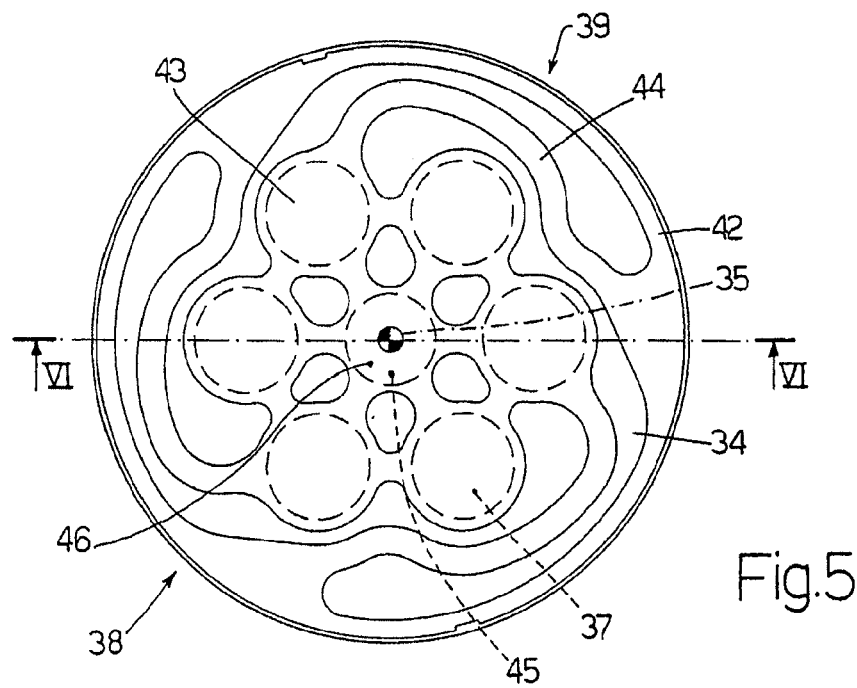
FIG. 5 is a plan view of a different embodiment of an intake valve of the fuel pump of FIG. 1.
Figure 6:
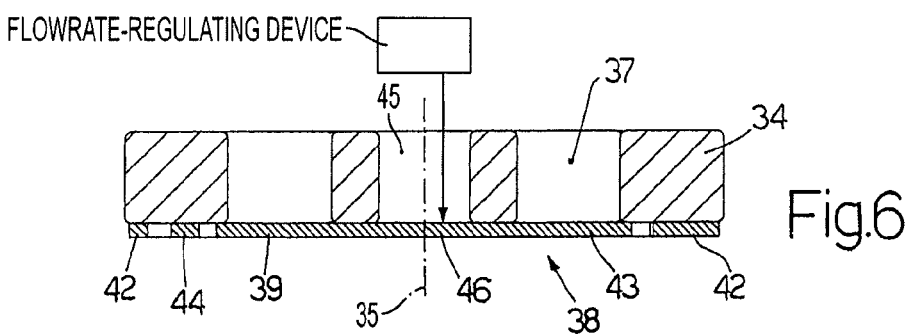
FIG. 6 is a cross-sectional side view according to the line VI-VI of the intake valve of FIG. 5.
Figure 7:
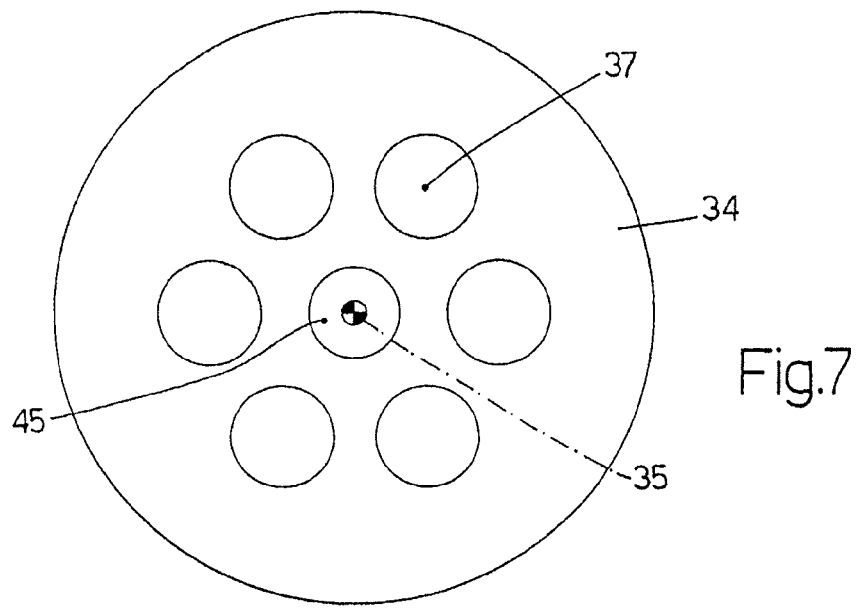
FIG. 7 is a top plan view of the intake valve of FIG. 5.

FIGS. 5, 6 and 7 illustrate a different embodiment of an intake valve 14, in which the disk 34, in addition to the supply holes 37 distributed symmetrically about the central axis 35, also has a further control hole 45, which is set in a central position and is closed by a central portion 46 of the lamina 38. The control hole 45 can be engaged by a flowrate-regulating device so as to press upon the central portion 46 of the lamina 38 and consequently delay natural closing of the intake valve 14 in order to enable a certain amount of petrol present in the chamber 13 to flow back through the supply pipe 36 instead of being pumped through the delivery valve 15. In the embodiment illustrated in FIGS. 5, 6 and 7, the sealing elements 43 must be connected to the central portion 46 of the lamina 38 so that by pressing on the central portion 46 of the lamina 38 all the sealing elements 43 will remain separate from the disk 34.

According to the embodiment illustrated in FIGS. 2, 3 and 4, each sealing element 43 is connected to the outer ring 42 by means of a stem 44 thereof. According to the embodiment illustrated in FIGS. 5, 6 and 7, some sealing elements 43 are connected to the outer ring 42 by means of a stem 44 thereof, whereas other sealing elements 43 are not directly connected to the outer ring 42, but are connected to the sealing elements 43, which are directly connected to the outer ring 42.

The intake valve 14 described above presents a high permeability and a short response time. In fact, the presence of a large number of supply holes 37 and of respective flaps 39 enables a high permeability to be obtained together with a very small mobile mass. Consequently, the intake valve 14 described above is suited for being used in a fuel pump for an internal-combustion engine, in which a high speed of response and a high permeability, in the presence of relatively contained pressure jumps, are required.

It should be noted that the intake valve 14 described above is particularly suited in a membrane fuel pump, in so far as said intake valve 14 has a large diameter and can hence be combined in an optimal way with a pumping chamber which also has a large diameter, as occurs in a fuel membrane pump.

The invention has been described in detail with respect to referred embodiments, and it will now be apparent from the foregoing to those skilled in the art, that changes and modifications may be made without departing from the invention in its broader aspects, and the invention, therefore, as defined in the appended claims, is intended to cover all such changes and modifications that fall within the true spirit of the invention.

What is claimed is:

1. A fuel pump for an internal-combustion engine, the fuel pump comprising:
   a first variable-volume chamber for containing fuel;
   at least one intake valve, which is connected to the first variable-volume chamber and comprises a disk having a plurality of through supply holes, and a deformable lamina fixed to the disk in a position corresponding to a peripheral edge thereof and including a series of flaps, each of which is coupled to a respective supply hole, and a further control hole, which is set in a central position and is closed by a central portion of the lamina;
   at least one delivery valve connected to the first variable-volume chamber;
   pumping means for varying the volume of the first variable-volume chamber, wherein the pumping means include:
      a second chamber for containing oil;
      a piston slidably mounted within the second chamber;
      actuator means for imparting on the piston a reciprocating motion within the second chamber itself; and
      a deformable membrane for separating the first chamber from the second chamber in a fluid-tight way; and
      a flowrate-regulating device engaging the control hole of the disk of the intake valve so as to press upon the central portion of the lamina and consequently delay natural closing of the intake valve.

2. The fuel pump according to claim 1, wherein the lamina of the intake valve comprises an outer ring, which is fixed to the disk; extending from the outer ring of the lamina towards the inside are the flaps, each of which comprises a sealing element having a circular shape.

3. The fuel pump according to claim 2, wherein the flaps are connected to the outer ring by means of thin stems.

4. The fuel pump according to claim 2, wherein each sealing element is connected to the ring by means of a respective thin stem.

5. The fuel pump according to claim 2, wherein some sealing elements are connected to the outer ring by means of a stem thereof, whilst other sealing elements are not directly connected to the outer ring, but are connected to the sealing elements that are directly connected to the outer ring.

6. The fuel pump according to claim 1, wherein the sealing elements are connected to the central portion of the lamina so that, by pressing on the central portion of the lamina, the sealing elements will remain separate from the disk.

7. The fuel pump according to claim 1, wherein the second chamber is provided with a further valve designed to maintain constant an amount of oil contained in the second chamber itself.

* * * * *

UNITED STATES PATENT AND TRADEMARK OFFICE
CERTIFICATE OF CORRECTION

PATENT NO. : 7,575,419 B2
APPLICATION NO. : 11/436999
DATED : August 18, 2009
INVENTOR(S) : Mattioli et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 435 days.

Signed and Sealed this

Seventh Day of September, 2010

David J. Kappos
*Director of the United States Patent and Trademark Office*